(12) United States Patent
Pirttimaki et al.

(10) Patent No.: US 7,836,342 B2
(45) Date of Patent: Nov. 16, 2010

(54) PROVIDING MAINTENANCE ACCESS VIA AN EXTERNAL CONNECTOR

(75) Inventors: Antti Pirttimaki, Tampere (FI); Miikka Merilahti, Tampere (FI); Rolf Kuehnis, Vesilahti (FI); Jouni Hietamaki, Tampere (FI)

(73) Assignee: Nokia Corporation, Espoo (FI)

( * ) Notice: Subject to any disclaimer, the term of this patent is extended or adjusted under 35 U.S.C. 154(b) by 991 days.

(21) Appl. No.: 11/522,053

(22) Filed: Sep. 15, 2006

(65) Prior Publication Data

US 2008/0078669 A1 Apr. 3, 2008

(51) Int. Cl.
*G06F 11/00* (2006.01)
(52) U.S. Cl. .......................... 714/30; 714/733
(58) Field of Classification Search ............ 714/27, 714/29, 30, 724, 733, 734
See application file for complete search history.

(56) References Cited

U.S. PATENT DOCUMENTS

| 5,889,713 A | 3/1999 | Chan et al. |
| 5,938,779 A | 8/1999 | Preston |
| 6,612,498 B1 | 9/2003 | Lipponen et al. |
| 7,157,952 B2 * | 1/2007 | Avants et al. ............... 327/276 |
| 2003/0120970 A1 * | 6/2003 | Chen ........................... 714/25 |
| 2005/0182881 A1 | 8/2005 | Chou et al. |
| 2005/0197017 A1 | 9/2005 | Chou et al. |
| 2005/0215243 A1 * | 9/2005 | Black et al. ................. 455/417 |
| 2005/0223298 A1 * | 10/2005 | Higuchi et al. ............... 714/46 |
| 2007/0241434 A1 * | 10/2007 | Inada et al. ................. 257/678 |

* cited by examiner

*Primary Examiner*—Dieu-Minh Le

(57) ABSTRACT

This invention relates to a method, an apparatus, an electronic device, a system, and a computer program product for selecting at least one component out of at least one maintenance component and at least one non-maintenance component, wherein said at least one maintenance component and said at least one non-maintenance component represent electronic components arranged in an apparatus; and switching an external connector of said apparatus to said at least one selected component.

32 Claims, 6 Drawing Sheets

PROVIDING MAINTENANCE ACCESS VIA AN EXTERNAL CONNECTOR

FIELD OF THE INVENTION

This invention relates to a method, an apparatus, an electronic device, a system, and a computer program product for an apparatus comprising an external connector.

BACKGROUND OF THE INVENTION

Common mobile terminals are designed around a processing core, wherein terminal software (SW) is running on said processing core.

Tracing, testing, tuning and debugging terminal SW is very difficult using only normal output devices such as display or serial interfaces that come out of the processing core, i.e. out of the terminal processor.

Therefore the terminal processors have dedicated interfaces for tracing, testing, tuning and debugging. They are frequently used during the R&D phase but also after the product is on the market, but, when product matures and the terminal is put inside its actual mechanics, these tracing, testing, tuning and debug interfaces are left inside these covers in order to prevent accessing them anymore. If some bug or fail is discovered at the late phase of the project, it is difficult to trace, test, tune or debug the soft- and hardware since there is no access to these trace, test, tune&debug interfaces without hardware modifications.

For instance, in some mobile terminals the trace, test, tune &debug connections are routed under the battery, and if someone wants to use them a special battery and a jig are required. This use of a special battery and jig is only suited for laboratory conditions, but trace, test, tune &debugging in the field is not that easy. Furthermore, a specific extra connector to sales terminal just for trace, test, tune &debug purpose is not feasible.

On the other hand, for instance, network operators require products having such tracing capabilities to test their networks or third party SW developers may require such products for testing their SW.

SUMMARY OF THE INVENTION

In view of the above-mentioned problem, it is, inter alia, an object of the present invention to provide an apparatus, a method, a device, a computer program product, and a system for enabling a simplified access to maintenance functions of an apparatus.

An apparatus is disclosed which comprises at least one maintenance component, and at least one non-maintenance component, wherein said at least one maintenance component and said at least one non-maintenance component represent electronic components, and an external connector, wherein said external connector is configured to be switched to at least one out of said at least one maintenance component and said at least one non-maintenance component.

Said external connector may be arranged at the outside of a housing of said apparatus, or at the outside of a housing of a device comprising said apparatus, but it may also be covered by any kind of covering, e.g. a cover sheet or any other means for covering. Said connector may be a classical connector, but it may also be any other kind of linkage element suited for an electric connection like a slot or a socket or the like.

Said at least one maintenance component is configured to provide maintenance functions to said apparatus. For instance, said apparatus may comprise at least one processing unit, and said at least one maintenance component may provide functions for debugging, testing, tuning and/or tracing software on said at least one processing unit or providing any other maintenance function to at least one of said at least one processing unit.

Said maintenance functions may also be used for research and development and/or operators using said apparatus.

For instance, in order to control said maintenance functions of said at least one maintenance component, said at least one maintenance component may be suited to be connected to a maintenance tool outside the apparatus in order to perform maintenance operations to said apparatus.

For instance, said apparatus may comprise a printed wiring board with at least one processing component, and at least one of said at least one maintenance component may be arranged in said printed circuit board or in a processing component of said at least one processing component, wherein at least one of said at least one processing component may be an ASIC, FPGA or DSP or any other processing component.

Furthermore, at least one of said at least one maintenance component may represent a Joint Test Action Group (JTAG) component, or at least one of said at least one maintenance component may represent any other debug/test/tune/trace component like IEEE P1149.7 or STP/PTI or STI/XTI or NEXUS or ARM Ltd debug/test/tune/trace modules such as SWD or SWI or ETM or any other similar debug/test/tune/trace component.

For instance, at least one of said at least one maintenance component may be provided with a special interface, wherein said special interface is one out of a JTAG, IEEE P1149.7 or STP/PTI or STI/XTI or SWD/SWI/ETM interface.

Furthermore, at least one of said at least one non-maintenance component may also be provided with a special interface, which may be used for connecting one out of said at least one non-maintenance component to the external connector.

Said at least one non-maintenance component may provide any kind of input and/or output function for the operation of the apparatus, and the external connector may be a corresponding connector to said input and/or output function of said non-maintenance component, wherein said external connector may be a standardized connector. E.g. said non-maintenance component may represent a memory component, and said external connector may represent a corresponding external memory connector. For instance, said external memory connector may be a Multi Media Card (MMC) connector, or a MemoryStick connector, or a Transflash connector, or a Secure Digital (SD) Card connector, or any other kind of memory connector. Furthermore, said external connector may also be a Pop-Port® connector or any other external connector suited for the operation of said apparatus like any accessory connector or multipurpose connector, e.g. a USB connector. In case said external connector represents a Pop-Port® connector then at least one of said at least one non-maintenance component may represent a Pop-Port® component.

The external connector is configured to be switched to one out of said at least one maintenance component and said at least one non-maintenance component. For instance, this may by performed by at least one switching component, wherein said at least one switching component may be controlled by software, e.g. by an operating system of said apparatus, or by hardware. Furthermore, at least one of said at least one switching component may be a multiplexer.

For instance, a user may select at least one component out of said at least one maintenance component and said at least one non-maintenance component, e.g. by use of a display and a user interface, so that said at least one switching component switches said at least one selected component to said external connector. Furthermore, for instance, the selection of at least one component out of said at least one maintenance component and said at least one non-maintenance component may be performed by software and/or hardware, e.g. the apparatus or an electronic device comprising said apparatus may comprise a dedicated pin for enabling switching the external connector to a maintenance component or a non-maintenance component, or a special data sequence in a data stream or a predefined key input like power-up the apparatus/device while key "0" is pressed or any other key sequence may be used for switching the external connector.

For instance, exactly one component of said at least one maintenance component and said at least one non-maintenance component may be switched to the external connector, but it may be also possible to switch a plurality of components of said at least one maintenance component and said at least one non-maintenance component to the external connector, e.g. by associating different pins of the external connector to respective components of said plurality of components. For instance, at least two maintenance components may be switched to the external connector in parallel.

For instance, during a normal operation mode of the apparatus, the external connector may be switched to one out of said at least one non-maintenance component so that a user can use the functionalities provided by said non-maintenance component, e.g. by connecting a device suited for said non-maintenance component to said external connector. E.g. in case that one out of said at least one non-maintenance component represents a memory component and the external connector represents a memory connector, a user may connect a memory device like a memory card to said memory connector in order to read data from the memory component and/or store data in the memory component. Thus, in this operation mode the external connector may act as a common memory connector providing the whole memory connector functionality to the user. Or, for instance, in case that the external connector is any other accessory connector or multipurpose connector, then the external connector provides the full functionality of said accessory connector or multipurpose connector in said operation mode.

Furthermore, said external connector may be switched to at least one out of said at least one maintenance-component in order to provide access to said at least one out of said at least one maintenance component through said external connector. Thus, said external connector can be used as a maintenance interface which is switched to at least one out of said at least one maintenance component or to at least one interface associated with at least one out of said at least one maintenance component, so that this external connector can be used as a maintenance interface which may for instance be used by a maintenance toolkit like a debug, test, tune or trace tool.

For example, in case that said external connector represents an external memory connector, then this external memory connector may be used as a maintenance interface, or if said external connector represents a Pop-Port® connector, then this Pop-Port® connector may be used as a maintenance interface.

Thus, an existing external connector of an apparatus, e.g. an external memory connector or a Pop-Port® connector, can be used as a maintenance interface providing access to at least one of said at least one maintenance component of said apparatus. Hence, no additional maintenance connector is necessary since an existing external connector of said apparatus can be used to provide access for maintenance functions like tracing, testing, tuning and/or debugging.

For instance, this allows providing access for maintenance functions of apparatuses with final mechanics having no separate external maintenance connector by use of said external connector configured to be switched to one out of said at least one maintenance component and said at least one non-maintenance component.

For instance, said apparatus may be a mobile terminal or any other wireless device, and at least one of said at least one maintenance component may be configured to provide tracing, testing, tuning and/or debugging of terminal software (SW) of said apparatus, wherein said terminal SW may run on at least one processing component of said apparatus.

Thus, said apparatus enables maintenance functions like debug, test, tune and/or trace functions whenever they are needed by use of said external connector. For instance, an existing external connector of an apparatus, e.g. an external memory connector or an external Pop-Port® connector may be configured to provide also maintenance functionality.

Furthermore, said apparatus enables real hardware access to said at least one maintenance component.

According to an embodiment of the present invention, said apparatus further comprises at least one switching component configured to switch said external connector to at least one out of said at least one maintenance component and said at least one non-maintenance component.

Said at least one switching component may comprise a plurality of switching components, e.g. arranged in a tree structure in order to switch at least one out of at said at least one maintenance component and at least one non-maintenance component to said external connector. Furthermore, at least one of said at least one switching component may be a multiplexer.

Said at least one switching component may be connected to a processing unit of said apparatus in order to be controlled, so that for instance a user may select at least one component out of said at least one maintenance component and said at least one non-maintenance component to be switched to said external connector.

According to an embodiment of the present invention, said apparatus comprises at least one processing component, wherein each of said at least one processing component comprises at least one maintenance component of said at least one maintenance component, and wherein a first processing component of said at least one processing component further comprises at least one of said at least one non-maintenance component.

For instance, at least one of said at least one processing component is one out of an ASIC, FPGA or DSP or any other processing component and may be suited to run software, e.g. terminal software of a mobile terminal, and said at least one maintenance component of said at least one maintenance component in a processing component of said at least one processing component is configured to trace and/or debug, test, tune software in said processing component.

For instance, one of said at least one processing component may represent a radio processing component, e.g. a baseband processor core for GSM/UMTS or any other wireless standard or a radio frequency circuit for wireless transmission, and one of said at least one maintenance component may be configured to perform testing and/or tuning said radio processing component.

Furthermore, one of said at least one maintenance component may be used for a boundary scan of at least one processing component.

Furthermore, at least one of said at least one switching component may be arranged outside of said at least one processing component, and the processing components may comprise ports/interfaces associated with maintenance components and/or non-maintenance components inside a respective processing unit, wherein said ports/interfaces are connected to said at least one switching component so that said at least one switching component can switch at least one out of said at least one maintenance component and said at least one non-maintenance component to said external connector. Thus, for instance, existing ports/interfaces for trace and/or debug, test, tune functions and/or other maintenance functions on said at least one processing component can be switched to said external connector.

According to an embodiment of the present invention, a first switching component of said at least one switching component is arranged in said first processing component, and said at least one of said at least one maintenance component and said at least one of said at least one non-maintenance component of said first processing component are connected to an input of said first switching component.

For instance, an output of said first switching component may be connected to a port of said first processing component. This port may be connected to the external connector, or to a further switching component of said at least one switching component.

Thus, said first switching component may be used to connect at least one out of said at least one of said at least one maintenance component and said at least one of said at least one non-maintenance component of said first processing component to said port of said first processing component, and if said port is connected to said external connector, said first switching component switches the at least one selected component to the external connector.

According to an embodiment of the present invention, at least one maintenance component of at least one further processing component of said at least one processing component is connected to said input of said first switching component.

For instance, said first processing component may comprise at least one further interface in order to be connected to said at least one maintenance component of said at least one further processing component, wherein said at least one further interface is connected to said input of said first switching component.

Thus, said first switching component in said first processing component may be used to switch at least one of said at least one maintenance component of at least one further processing component to said external connector.

According to an embodiment of the present invention, at least one of said at least one further processing component comprises at least two maintenance components, and at least one of said at least one of said at least one further processing component comprises a switching component configured to switch at least one out of said at least two maintenance components to the input of said first switching component.

For instance, exactly one of said at least two maintenance components may be switched by said switching component to the input of said first switching component, or a plurality of components of said at least two maintenance components may be switched by said switching component to the input of said first switching component.

According to an embodiment of the present invention, said external connector represents one out of a memory connector and a Pop-Port® connector, and at least one of said at least one non-maintenance component represents one out of a memory component and a Pop-Port® component.

According to an embodiment of the present invention, at least one of said at least one maintenance component of said at least one maintenance component is at least one out of a debug, test, tune component and a trace component, and said debug component is configured to debug software of the corresponding processing component, and said trace component is configured to trace software of the corresponding processing component or any HW component. For instance, said trace component may be configured to perform a boundary scan.

According to an embodiment of the present invention, at least one of said at least one maintenance component is at least one out of a JTAG, IEEE P1149.7, STP/PTI and ST/XTI and SWD/SWI/ETM component.

According to an embodiment of the present invention, said external connector is provided with a security function if at least one out of said at least one maintenance component is switched to said external connector.

For instance, said apparatus may comprise a trusted computing module for providing security functions to said external connector and/or the data transmitted via said external connector when said external connector is switched to the maintenance component. For instance, a proper Research and Development Certificate (RDC) may be used for said security functions.

Moreover, a method is disclosed, said method comprising selecting at least one component out of at least one maintenance component and at least one non-maintenance component, wherein said at least one maintenance component and said at least one non-maintenance component represent electronic components arranged in an apparatus, and switching an external connector of said apparatus to said at least one selected component.

Therein, it is understood that the description of the features and advantages presented with respect to the preceding embodiments also applies to this disclosed method.

Furthermore, an electronic device is disclosed, said electronic device comprising an apparatus as described in the preceding description, and a housing, wherein said external connector is located at said housing.

Said electronic device may be mobile device or a non-mobile device.

For instance, said external connector may be placed at an outside of said housing, or the external connector may be placed under a cover.

According to an embodiment of the present invention, said electronic device further comprises a display and a user interface.

According to an embodiment of the present invention, said electronic device is a mobile terminal.

For instance, said mobile terminal may be a mobile phone, or any other wireless mobile terminal like a handheld device and/or a PDA, which may be suited for Bluetooth® transmission and/or WLAN or any other kind of wireless transmission.

Therein, it is understood that the description of the features and advantages presented with respect to the preceding embodiments also applies to this disclosed electronic device.

Furthermore, a system is disclosed, wherein said system comprises an apparatus as described in the preceding description, and a maintenance toolkit, wherein said maintenance toolkit configured to be connected to said external connector of said apparatus.

According to an embodiment of the present invention, said maintenance toolkit provides at least one out of a debugging, testing, tuning function and a trace function.

According to an embodiment of the present invention, said maintenance toolkit is connected to said external connector via a maintenance adaptor.

Therein, it is understood that the description of the features and advantages presented with respect to the preceding embodiments also applies to this disclosed system.

Finally, a computer program product in which a program code is stored in a computer readable medium is disclosed, said program code realizing the following when executed by a processor: selecting one component out of at least one maintenance component and at least one non-maintenance component, wherein said at least one maintenance component and said at least one non-maintenance component represent electronic components arranged in an apparatus; and switching an external connector of said apparatus to said selected component.

According to an embodiment of the present invention, said switching is performed by at least one switching component arranged in said apparatus, wherein said switching component is configured to switch said external connector to at least one out of said at least one maintenance component and said at least one non-maintenance component.

According to an embodiment of the present invention, said program code further causes providing said external connector with a security function in case that at least one of said at least one selected component is out of said at least one maintenance component.

Therein, it is understood that the description of the features and advantages presented with respect to the preceding embodiments also applies to this disclosed computer program product.

Other objects and features of the present invention will become apparent from the following detailed description in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
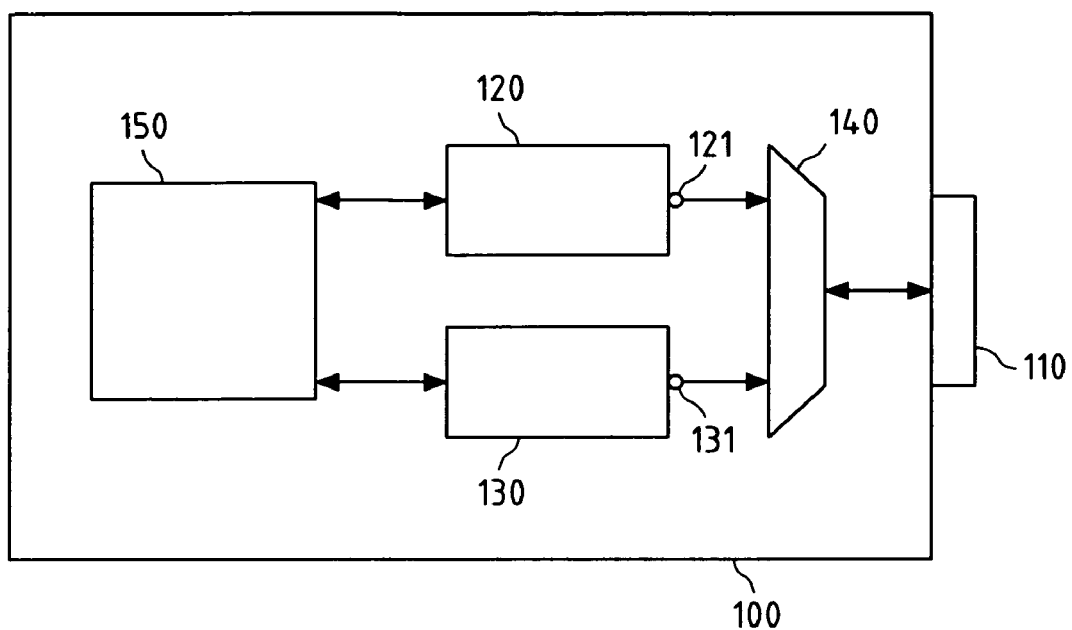
FIG. 1: a schematic block diagram of a first exemplary embodiment of an apparatus according to the present invention.

FIG. 1 is a schematic block diagram of a first exemplary embodiment of an apparatus according to the present invention, wherein the apparatus 100 comprises an external connector 110, a maintenance component 120 and a non-maintenance component 130, a switching component 140 and, for example, a processing unit 150. For instance, said processing unit 150, said maintenance component 120 and said non-maintenance component 130 may be arranged in single-chip, but they also can be arranged separately from each other.

Said external connector 110 may be arranged at the outside of a housing of said apparatus 100 or of a housing of an electronic device comprising said apparatus 100, and said external connector 110 may be covered by a cover.

The apparatus may also be viewed as comprising at least one means for maintenance 120, at least one means for non-maintenance 130, wherein the at least one means for maintenance and the at least one means for non-maintenance represent electronic means, and an external connecting means 110, wherein the external connecting means is configured to be switched to at least one out of the at least one means for maintenance and the at least one means for non-maintenance. In that case, the apparatus may further comprise at least one switching means 140 for switching the external connecting means to at least one out of the at least one means for maintenance and the at least one means for non-maintenance. The apparatus may furthermore comprise at least one processing means 150, wherein each of the at least one processing means comprises at least one means for maintenance of the at least one means for maintenance, and wherein a first processing means of the at least one processing means further comprises at least one of the at least one means for non-maintenance.

The maintenance component or means 120 is configured to provide maintenance functions to said apparatus 100, e.g. to said processing unit or means 150, or to the non-maintenance component or means 130 or to any other component or means of said apparatus 100. Said maintenance function may for example be at least one out of a debug function and a trace function and any other maintenance function (like testing, tuning etc), wherein said maintenance component or means 120 may comprise a maintenance port/interface 121 which may be used for connecting the maintenance component or means 120 to a maintenance tool (not shown in FIG. 1) in order to control the maintenance component or means 120 and to perform maintenance operations to said apparatus 100. For instance, if said maintenance component or means 120 is arranged in a printed circuit board or in a processing component like an ASIC, FPGA or DSP or any other processing component of said apparatus 100, said maintenance component or means 120 may represent a Joint Test Action Group (JTAG) component and the maintenance component interface or means 121 may represent a JTAG interface, Furthermore, said maintenance component or means 120 may represent any other debug, test, tune or trace component like IEEE P1149.7 or STP/PTI or STI/XTI or SWD/SWI/ETM.

Said maintenance functions may also be used for research and development and/or operators using said apparatus.

Furthermore, the non-maintenance component or means 130 may also comprise a port/interface 131 which may be used for connecting the non-maintenance component or means 130 to the external connector or external connecting means 110, wherein said non-maintenance component or means 130 may provide any kind of input and/or output function for the operation of the apparatus 100, and the external connector or external connecting means 110 may be a corresponding connector to said input and/or output function of said non-maintenance component or means 130. E.g. said non-maintenance component or means 130 may represent a memory component or means 130, and said external connector or external connecting means 110 may represent a corresponding external memory connector. For instance, said external memory connector may be a Multi Media Card (MMC) connector, or a MemoryStick connector, or a Transflash connector, or a Secure Digital (SD) Card connector, or any other kind of memory connector. Still furthermore, said external connector or external connecting means 110 may also be a Pop-Port® connector and said non-maintenance component or means 130 may represent a Pop-Port® component or means 130, or said external connector or external connecting means 110 may also be any other kind of accessory or multipurpose connector. A Pop-Port® interface is a universal plug-in port, available with many mobile devices of the assignee hereof. Such a Pop-Port® interface may for instance comprise one metal pin on either end, and a plastic tab containing a number of contacts such as thirteen contacts. The port may for instance be able to handle signals for hands-free microphone, stereo speakers, FBus Rx/Tx or USB signals for the phones supporting them, power output for feeding accessories, a bidirectional serial control bus (Accessory Control Interface) for such accessories, etc.

The external connector or external connecting means is configured to be switched to at least one out of said maintenance component or means 120 and said non-maintenance component or means 130 by means of the switching component or means 140. For instance, said external connector or external connecting means may be switched either to said maintenance component or means 120 or to said non-maintenance component or means 130. For example, in the case that the apparatus comprises a plurality of maintenance components (not shown in FIG. 1), the external connector may be configured to be switched to at least one of said plurality of maintenance components or to said non-maintenance component or means 130 by means of said switching component or means 140. This switching component or means 140 may be controlled by software, e.g. by an operating system of said apparatus, or by hardware. Furthermore, said switching component or mean 140 may be a multiplexer.

During a normal operation mode of the apparatus 100, the external connector or external connecting means 110 may be switched to the non-maintenance component or means 130 so that a user can use the functionalities provided by said non-maintenance component or means 130 and said external connector or external connecting means 110. E.g. in case that the non-maintenance component or means 130 represents a memory component 130 and the external connector or external connecting means represents a memory connector 110, a user may connect a memory device like a memory card to said memory connector 110 in order to read data from the memory component 130 and/or to store data in the memory component 130. Thus, in this operation mode the external connector acts as a common memory connector providing the whole user functionality to the user.

Furthermore, said external connector or external connecting means 110 may be switched to the maintenance-component or means 120 in order to provide access to the maintenance component or means 120 through said external connector or external connecting means 110. Thus, said external connector or external connecting means 110 can be used as a maintenance interface which is switched by the switching component or means 140 to the interface 121 of the maintenance component or means 120, so that this external connector can be used as a maintenance interface which may for instance be used by a trace, debug, test and/or tune tool.

For example, in case that said external connector or external connecting means 110 represents an external memory connector 110, then this external memory connector 110 may be used as a maintenance interface, or if said external connector or external connecting means 110 represents a Pop-Port® component then this Pop-Port® component may be used as a maintenance interface.

Thus, an existing external connector or external connecting means 110 of an apparatus 100, e.g. an external memory connector 110, can be used as a maintenance interface providing access to a maintenance component or means 120 of said apparatus 100. Hence, no additional maintenance connector is necessary as an existing external connector or external connecting means 110 of said apparatus can be used to provide access for maintenance functions like tracing, testing, tuning and/or debugging.

For instance, this allows providing access for maintenance functions of apparatuses 100 with final mechanics having no separate external maintenance connector by use of said external connector or external connecting means 110 configured to be switched to one out of at least one maintenance component or means 120 and at least one non-maintenance component or means 130.

Furthermore, said apparatus may comprise a trusted computing module for providing security functions to said external connector or external connecting means 110 and/or the data transmitted via said external connector or external connecting means 110 when said external connector or external connecting means is switched to the maintenance component or means 120. For instance, a proper Certificate may be used for said security functions.

For instance, said apparatus 100 may be mobile terminal or any other wireless device, and said maintenance component or means 120 may be configured to provide tracing, testing, tuning and/or debugging of terminal software (SW) of said apparatus 100. Said terminal SW may run on said processing component or means 150 and/or on any other component in said apparatus.

The explanations mentioned above, in particular with respect to said external connector or external connecting means 110, the maintenance-component or means 120, the non-maintenance-component or means 130, and the switching component or means 140, also hold for the succeeding exemplary embodiments of the apparatus. It should be realized that even though not made explicit in the same way as described above, the various components mentioned in connection with the additional embodiments disclosed below may also be viewed as various corresponding means for carrying out the described functions.

Figure 2:
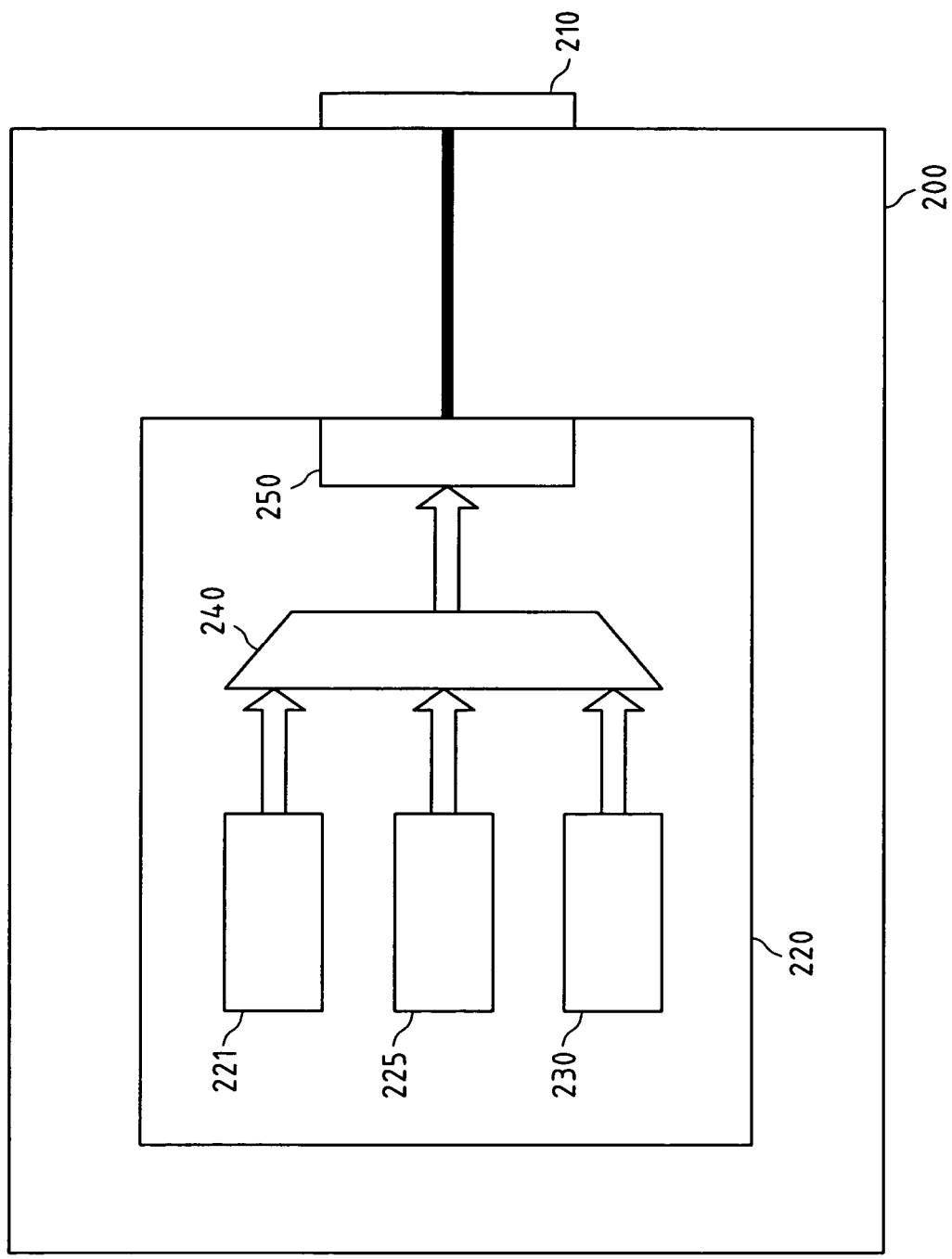
FIG. 2: a schematic block diagram of a second exemplary embodiment of an apparatus according to the present invention.

FIG. 2 depicts a second exemplary embodiment of an apparatus according to the present invention, wherein the apparatus 200 comprises a processing component 220 and an external connector 210.

Said processing component 220 may be an ASIC, or an FPGA or a DSP or any other processing component, wherein said processing component exemplarily comprises a first maintenance component 221, a second maintenance component 225, a non-maintenance component 230, a first switching component 240 and a port 250. Said first maintenance component 221 may represent a debug or testing or tuning component 221, e.g. for debugging software in said processing component 220, and said second maintenance component 225 may represent a trace component 225, e.g. for tracing software in said processing component 220. Said non-maintenance component 230 may represent a memory component 230, and said external connector 210 may represent a memory connector corresponding to said memory component 230.

The debug or test or tune component 221, the trace component 225 and the non-maintenance component 230 are connected to the first switching component 240, respectively, e.g. by a one or bi-directional bus, and said switching component 240 is configured to switch at least one out of said debug or test or tune component 221, trace component 225 and non-maintenance component 230 to the processing component's port 250. Said port 250 is connected to the external connector 210, so that it can be chosen by means of said first switching component 240 which of said debug or test or tune component 221, trace component 225 and non-maintenance component 230 should be accessible through said external connector 210. For instance, said switching component 240 may be configured to switch either the non-maintenance component 230 to the processing component's port 250, or both maintenance components, i.e. the test or tune component 221 and the trace component 225 to the processing component's port 250.

Furthermore, said switching component 240 may be configured to switch exactly one out of said debug or test or tune component 221, trace component 225 and non-maintenance component 230 to the processing component's port 250.

Thus, during a normal operation mode of the apparatus the switching component 240 may switch the non-maintenance component 230 to the external connector 210 via port 250, so that a user can use functionalities provided by said non-maintenance component 230, e.g. input/output functionalities like reading data from the non-maintenance component 230 and/or to storing data in the non-maintenance 230. Thus, in this operation mode the external connector acts as a common memory connector providing the whole user functionality of said processing component 220 to the user.

Alternatively, the external connector 210 may be switched to at least one out of said maintenance components 221, 225 of said processing component 220, so that for instance said external connector 210 can by used by a trace and/or debug and/or test and/or tune tool to connect to at least one out of said maintenance components 221, 225 of said processing component 220 in order to perform tracing and/or debugging of software of said processing component 220.

For instance, said first maintenance component 221 may be represented by a STP/PTI component which may comprise an interface/port comprising maximum 4 data (e.g. STP D0, STP D1) and one clk pin (STP CLK) plus a return channel, wherein said STP/PTI component provides trace functionality and the abbreviation STP denotes System Trace Protocol. Furthermore, said second maintenance component may be represented by a P1149.7 component which may comprise an interface/port using one clock pin (TCK) and one bidirectional TMSC pin. Further, said non-maintenance component 230 may be represented by a MicroSD component, and said external connector 210 may be represented by a MicroSD connector, wherein said MicroSD connector may be an 8-bit interface (4 data, 1 clock, 1 CMD (Secure Digital Command/Response Line), VCC, GND). Then, for example, during a normal operation mode the external connector 210 may be switched to the corresponding 8-bit interface of the MicroSD component 230 by the switching component 240, or, alternatively, said external connector 210 may be switched to at least one of the said first maintenance component 221 and said second maintenance component 225 with the following exemplary mapping of the STP/PTI interface/port and/or the P1149.7 interface/port to the external MicroSD connector:

| MicroSD connector | Maintenance Interface/Port |
| --- | --- |
| Clk | TCK |
| CMD | TMSC |
| Data 0 | STP D0 |
| Data 1 | STP D1 |
| Data 2 | NC (not connected) |
| Data 3 | STP CLK |

Figure 3:
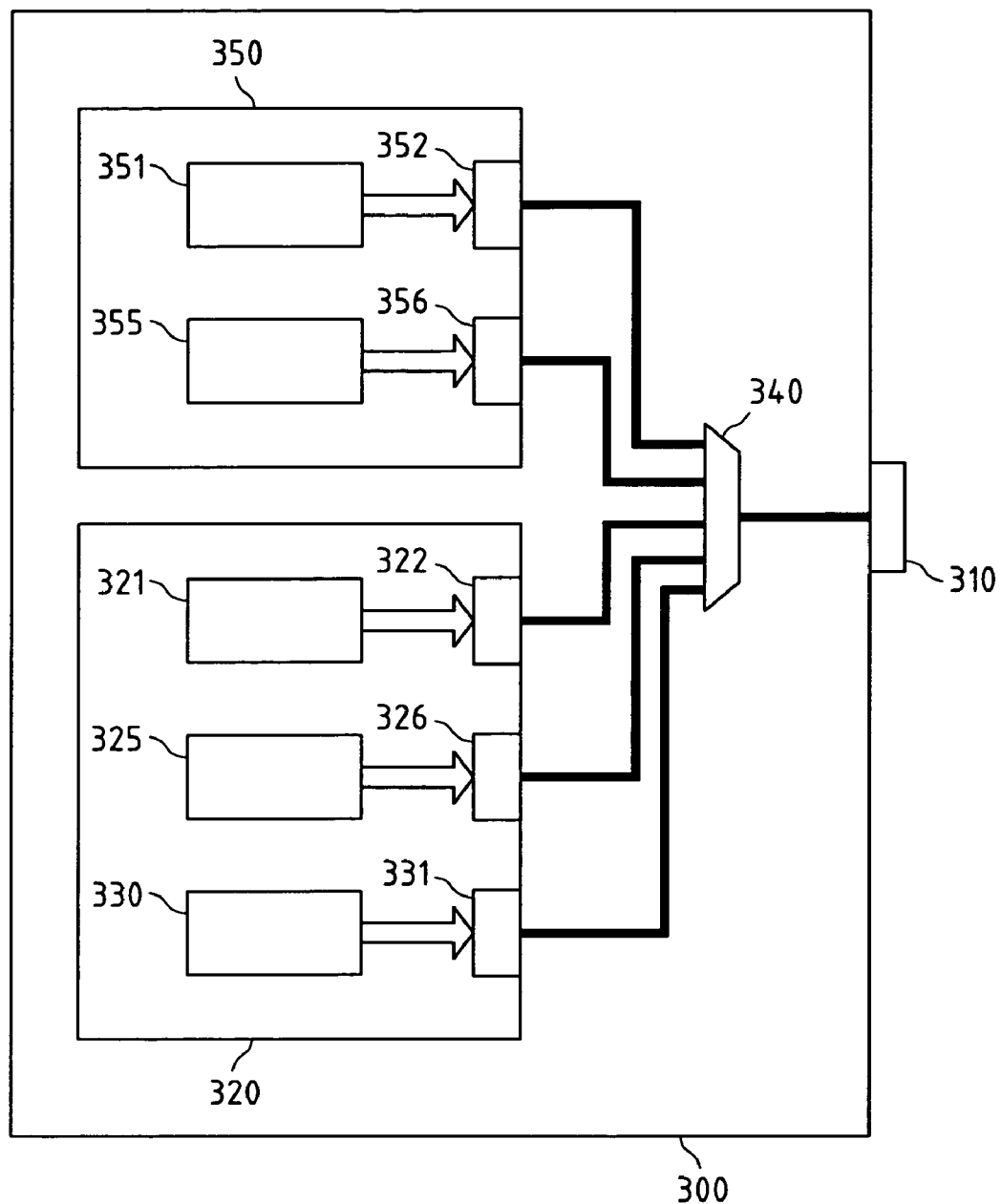
FIG. 3: a schematic block diagram of a third exemplary embodiment of an apparatus according to the present invention.

FIG. 3 depicts a third exemplary embodiment of an apparatus according to the present invention, wherein the apparatus 300 comprises a first processing component 320, a second processing component 350, a switching component 340, and an external connector 310.

Said first processing component 320 may comprise a first maintenance component 321, a second maintenance component 325, a non-maintenance component 330, a first port 322 associated with said first maintenance component 321, a second port 326 associated with said second maintenance component 325, and a third port 331 associated with said non-maintenance component 330.

For instance, as mentioned above in the preceding exemplary embodiments, said first maintenance component 321 may represent a trace component 321, and said second maintenance component 325 may represent a debug or test or tune component 325. In this case, the first port 322 may represent a trace port 322 and the second port 325 may represent a debug port 325. For instance, said trace port 322 and/or said debug port 325 may be a JTAG port, or an IEEE P1149.7 port, or a STP/PTI port or a XTI/STI port. Thus, for instance, said first maintenance component may be used to trace software of said first processing component 320, and said second maintenance component may be used to debug software or HW of said first processing component 320.

Furthermore, said second processing component 350 may comprise a third maintenance component 351 and a fourth maintenance component 355, wherein said third maintenance component 351 may represent a trace component 351 and said fourth maintenance component 355 may represent a debug component 355. Said trace component 351 and said debug component 355 of said second processing component 350 are connected to ports 352, 356, respectively, wherein said ports may represent a trace port 352 and a debug port 356, respectively. Thus, the explanations with respect to the maintenance components 321, 325 and the ports 322, 326 of the first processing component 320 also hold for the corresponding elements of the second processing component 350.

The switching component 340 is configured to switch at least one out of the ports 322, 326, 331 of the first processing component and the ports 352, 356 of the second processing component to the external connector 310. For instance, the switching component 340 may be configured to switch either the port 331 associated with the non-maintenance component 330 to the external connector 310, or to switch the ports 322, 326 associated with said first maintenance component 321 and second maintenance component 325 to the external connector 310, or to switch the ports 352, 356 associated with said third maintenance component 351 and fourth maintenance component 355 to the external connector 310. Furthermore, the switching component 340 may alternatively be configured to switch exactly one out of the ports 322, 326, 331 of the first processing component and the ports 352, 356 of the second processing component to the external connector 310, or any other combination of components which may depend on the amount of pins of the external connector and the amount of pins of the ports 322, 326, 331, 352, 356.

Thus, during a normal operation mode of the apparatus the switching component 340 may switch the third port 331 connected to the non-maintenance component 330 of the first processing component 320 to the external connector 310, so that the external connector 310 acts as a port for the non-maintenance component 330 according to the explanations mentioned in the preceding exemplary embodiments.

Furthermore, said switching component 340 may provide access to at least one out of said trace ports 322, 352 and said debug ports 326, 356 of said first and second processing components 320, 350 through said external connector 310.

This third exemplary embodiment allows to combine maintenance ports 322, 326, 352, 356 of at least one signal processing component 320, 350 with at least one non-maintenance port 331 so that these ports 322, 326, 352, 356, 331 share a single existing external connector 310.

Furthermore, the third exemplary embodiment of an apparatus 300 according to the present invention may comprise exactly one processing component 320, or it may comprise more than two processing components 320, 350 each containing at least one maintenance component. Further, said switching component 340 may comprise a plurality of switching components, e.g. arranged in a tree structure in order to switch at least one out of at least one maintenance component 321, 325, 351, 355 and at least one non-maintenance component 330 to said external connector 310.

Figure 4:
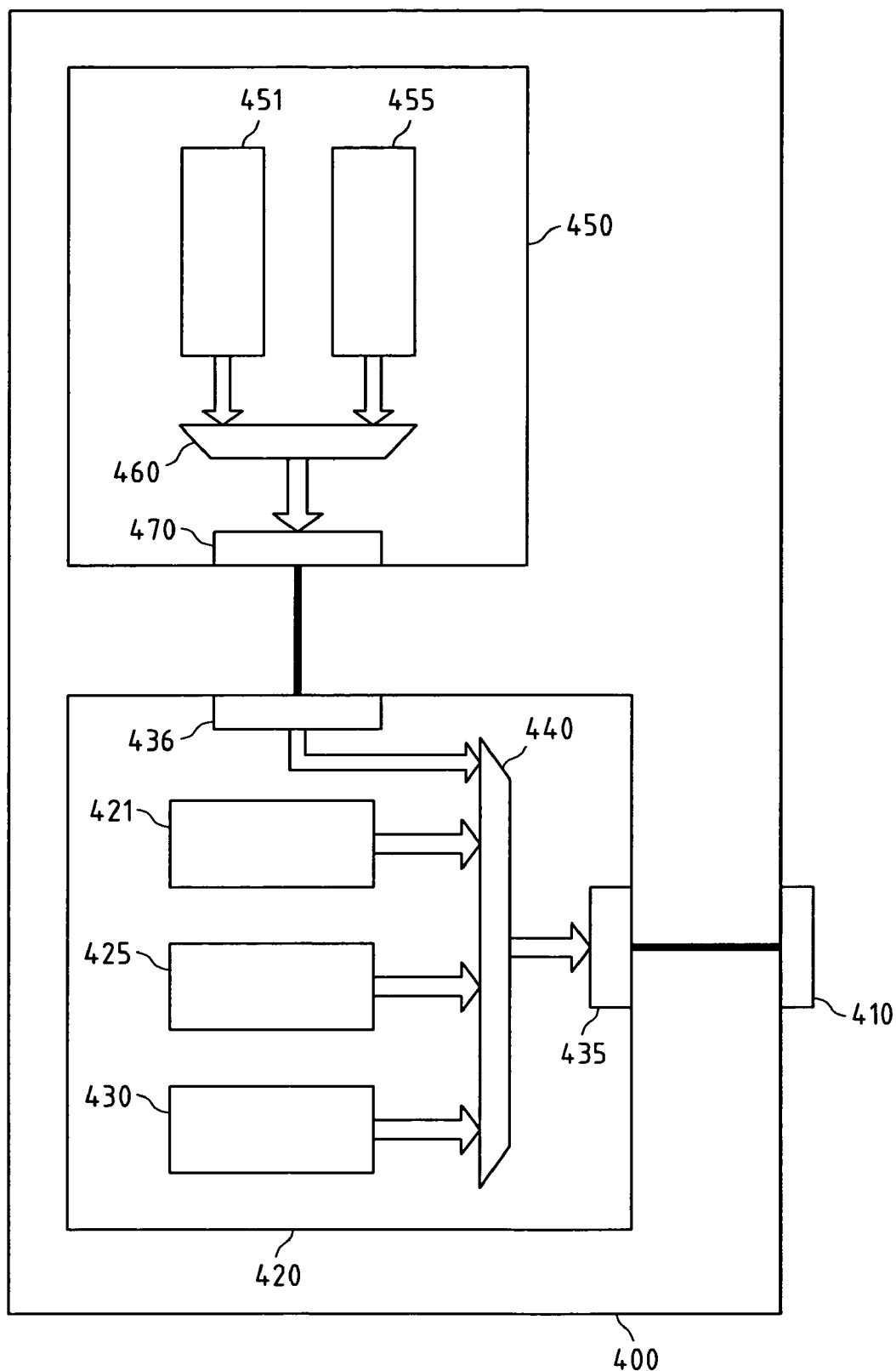
FIG. 4: a schematic block diagram of a fourth exemplary embodiment of an apparatus according to the present invention.

FIG. 4 depicts a fourth exemplary embodiment of an apparatus according to the present invention, wherein the apparatus 400 comprises a first processing component 420, a second processing component 450, and an external connector 410. Said first processing component 420 may be based on the first processing component 220 of the second embodiment, wherein the first maintenance component 421, the second maintenance component 425, the non-maintenance component 430 and port 435 may correspond to the respective elements of the first processing component 220 of the second embodiment.

Furthermore, said first processing component 420 comprises at least one internal interconnect 436, wherein said at least one internal interconnect 436 is connected to the first switching component 440, so that said first switching component 440 is configured to switch at least one out of the first maintenance component 421, the second maintenance component 425, the non-maintenance component 430 and said at least one internal interconnect 436 to the external connector 410 via the port 435 of said first processing component 420.

Thus, by use of said at least one internal connector 436, at least one further maintenance component 451, 455, e.g. at least one further maintenance component 451, 455 of at least one further processing component 450, can be connected via said first switching component 440 of said first processing component 420 to the external connector 410. For instance, the ports 352, 356 of said second processing component 350 of the third exemplary embodiment could be connected to said internal connector 436 (not shown in FIG. 4). Or, as depicted in FIG. 4, the second processing component 450 may comprise a second switching component 460 configured to switch either the third maintenance component 451 or the fourth maintenance component 455 of said second switching component 450 or both the third maintenance component 451 and the fourth maintenance component 455 of said second switching component 450 to the port 470, which also represents an internal interconnect 470. Said port 470 of said second processing component 450 is connected to the internal interconnect 436 of the first processing component 420. Thus, said first switching component 440 and said second switching component 460 are configured to switch at least one out of said at least one maintenance components 421, 425, 451, 455 and said at least on non-maintenance component 430 to the external connector 410.

Figure 5:
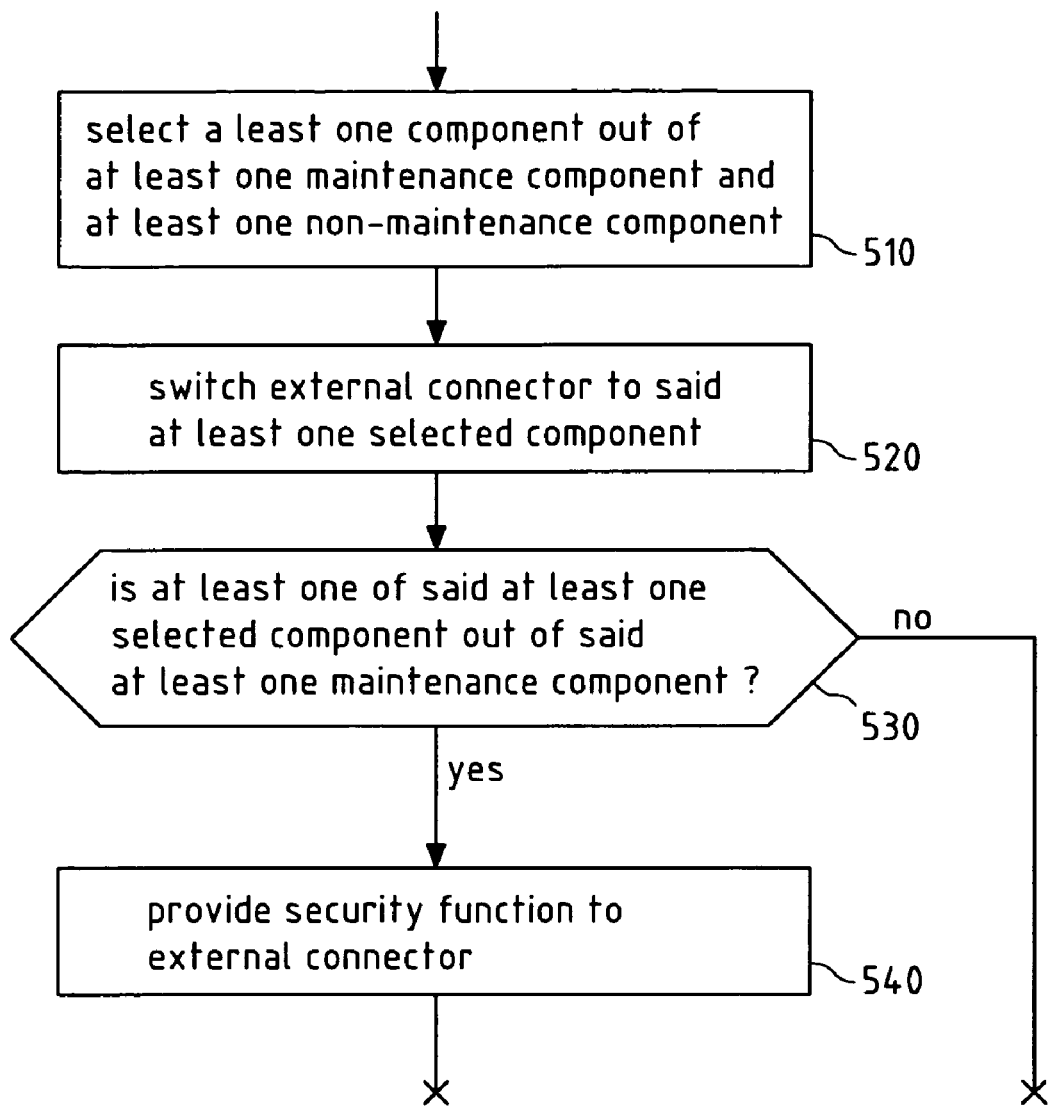
FIG. 5: a flow chart illustrating an exemplary embodiment of a method according to the present invention.

FIG. 5 depicts a flowchart illustrating an exemplary embodiment of a method according to the present invention, wherein said method may be applied to any of the preceding exemplary embodiments of an apparatus according to the present invention.

Therein, it is understood that the description of the features and advantages presented with respect to the preceding embodiments also applies to this disclosed exemplary embodiment of a method according to the present invention.

Said method comprises selecting at least one component or means out of at least one maintenance component or means and at least one non-maintenance component or means (step 510), wherein said at least one maintenance component or means 120, 221, 225, 321, 325, 351, 355, 421, 425, 451, 455 and said at least one non-maintenance component or means 130, 230, 330, 430 represent electronic components arranged in an apparatus 100, 200, 300, 400. For instance, a user may be asked for this selection by means of a display and a user interface.

Then, an external connector or external connecting means 110, 210, 310, 410 of said apparatus 100, 200, 300, 400 is switched to said at least one selected component or means. For instance, said switching may be performed by any of the above mentioned switching components or means 140, 240, 340, 440, 460.

Furthermore, it may be checked whether at least one of said at least one selected component or means is one out of said at least one maintenance component or means, and if said selected component or means is out of said at least one maintenance component or means (step 530), then a security function may be provided to said external connector or external connecting means 110, 210, 310, 410 and/or to the data transmitted via said external connector or external connecting means 110, 210, 310, 410 (step 540). For instance, said security function may be performed by a certificate that may be required to switch the external connector or external connecting means 110, 210, 310, 410 to at least one of said at least one maintenance component or mean or to activate a maintenance component or means when being switched to the external connector or external connecting means 110, 210, 310, 410. E.g., this certificate may be loaded when (or after) connecting tracing/debugging tool to the external connector or external connecting means 110, 210, 310, 410. For instance, said mobile terminal may be a mobile phone, or any other wireless mobile terminal like a handheld device and/or a PDA, which may be suited for Bluetooth® transmission and/or WLAN or any other kind of wireless transmission.

Furthermore, it may be further checked in step 540 whether a user has access for using the selected maintenance component or means, e.g. by use of said security function. Only if security is given, then said external connector or external connecting means provides access to said selected component.

Figure 6:
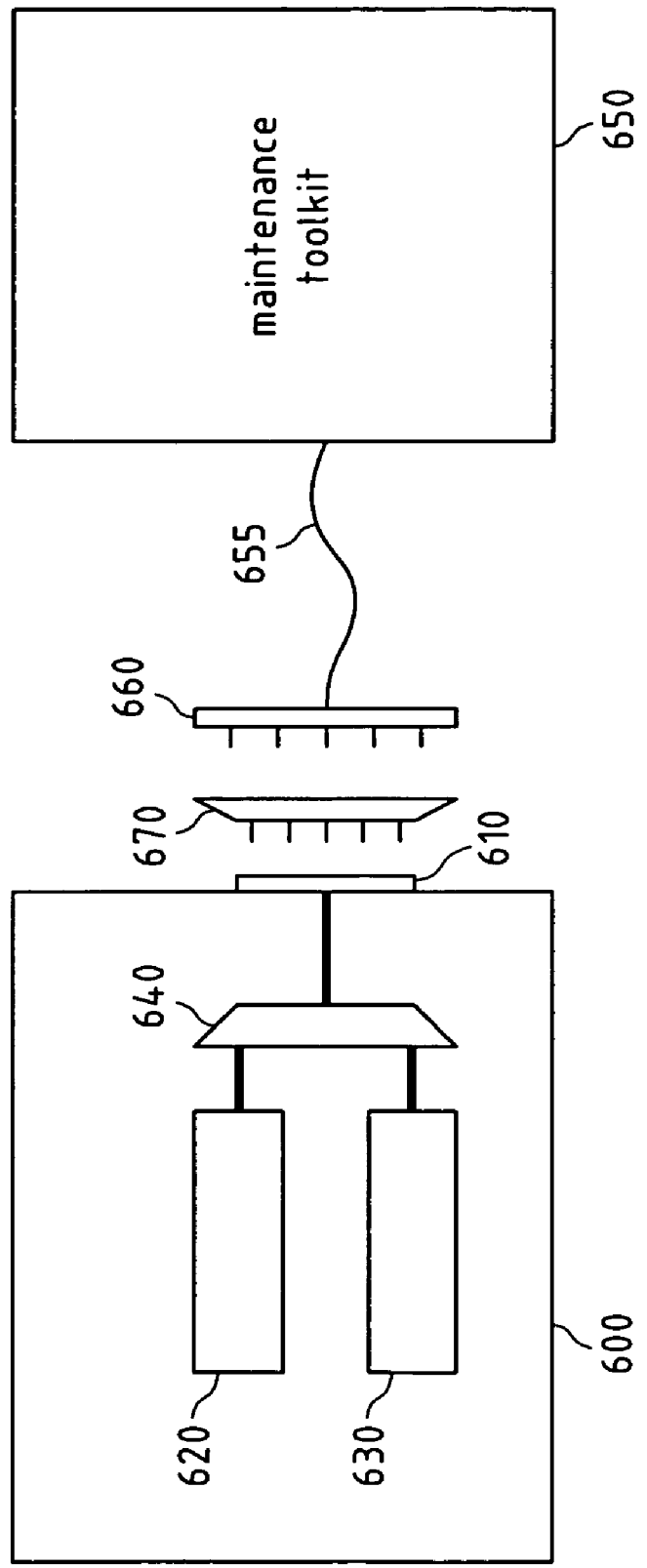
FIG. 6: a schematic block diagram of an exemplary embodiment of a system according to the present invention.

FIG. 6 depicts a schematic block diagram of an exemplary embodiment of a system according to the present invention. Said system depicted in FIG. 6 may comprise an apparatus 600, wherein said apparatus may be represented by any of the exemplary embodiments depicted in FIGS. 1 to 4, wherein the exemplary apparatus 600 depicted in FIG. 6 comprises at least one maintenance component 620 and at least one non-maintenance component 630, wherein at least one out of said at least one maintenance component 620 and said at least one non-maintenance component 630 can be connected to the external connector 610 by at least one switching component 640.

Therein, it is understood that the description of the features and advantages presented with respect to the preceding embodiments also applies to the apparatus 600 and the exemplary system according to the present invention depicted in FIG. 6.

Said system depicted in FIG. 6 may comprise a maintenance toolkit 650, wherein said maintenance toolkit 650 may be configured to control one out of said at least one maintenance component 620 of said apparatus 600.

A second connector 660 may be wired to said maintenance toolkit 650 by a wire or cable 655, wherein said second connector 660 may be directly connectable to the external connector 610, or it may be connectable to the external connector via an adapter 670.

Thus, said maintenance toolkit 650 can be connected to said external connector 610 of said apparatus in order to connect to at least one out of at least one maintenance component 620 of said apparatus.

Thus, easy reuse of current debug tools/maintenance toolkits 650 with standard connectors 660 can be performed by usage of said adapter 670.

For instance, said apparatus 600 may represent an apparatus for a mobile terminal, and said apparatus 600 may be integral part of an mobile terminal, and the external connector 610 of said apparatus may be placed at the outside of a housing of said mobile terminal. Furthermore, said maintenance toolkit 650 may be a toolkit for trace and/or debug functions of terminal software inside said apparatus.

For instance, said mobile terminal may be a mobile phone, or any other wireless mobile terminal like a handheld device and/or a PDA, which may be suited for Bluetooth® transmission and/or WLAN or any other kind of wireless transmission.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

The invention claimed is:

1. An apparatus comprising:
   at least one maintenance component of said apparatus; and
   at least one non-maintenance component of said apparatus;
      wherein said at least one maintenance component and said at least one non-maintenance component represent electronic components of said apparatus; and
   an external connector of said apparatus, wherein said external connector is configured to be switched from a normal mode of operation with said at least one non-maintenance component to operation with at least one maintenance component and configured to be switched from said operation with at least one maintenance component to said normal mode of operation with said at least one non-maintenance component.

2. The apparatus according to claim 1, wherein said apparatus further comprises at least one switching component configured to switch said external connector to at least one maintenance component and said at least one non-maintenance component.

3. The apparatus according to claim 2, wherein said apparatus comprises at least one processing component, wherein each of said at least one processing component comprises at least one maintenance component of said at least one maintenance component, and wherein a first processing component of said at least one processing component further comprises at least one of said at least one non-maintenance component.

4. The apparatus according to claim 3, wherein a first switching component of said at least one switching component is arranged in said first processing component, and wherein said at least one of said at least one maintenance component and said at least one of said at least one non-maintenance component of said first processing component are connected to an input of said first switching component.

5. The apparatus according to claim 4, wherein at least one maintenance component of at least one further processing component of said at least one processing component is connected to said input of said first switching component.

6. The apparatus according to claim 5, wherein at least one of said at least one further processing component comprises at least two maintenance components, and wherein at least one of said at least one of said at least one further processing component comprises a switching component configured to switch at least one out of said at least two maintenance components to the input of said first switching component.

7. The apparatus according to claim 3, wherein at least one of said at least one maintenance component of said at least one maintenance component is at least one out of a debug component, a test component, a tune component and a trace component, and wherein said debug component is configured to debug software of the corresponding processing component, and wherein said trace component is configured to trace software of the corresponding processing component or hardware of any hardware component.

8. The apparatus according to claim 7, wherein at least one of said at least one maintenance component is at least one out of a JTAG, IEEE P1149.7, STP/PTI and STI/XTI and SWD/SWI/ETM component.

9. The apparatus according to claim 1, wherein said external connector represents one out of a memory connector and a universal plug-in port, and wherein at least one of said at least one non-maintenance component represents one out of a memory component and a universal plug-in port component.

10. The apparatus according to claim 1, wherein said external connector is provided with a security function if at least one of said at least one maintenance component is switched to said external connector.

11. The method according to claim 1, wherein said external connector represents one out of a memory connector and a universal plug-in port, and wherein at least one of said at least one non-maintenance component represents one out of a memory component and a universal plug-in port component.

12. The apparatus of claim 1, wherein said apparatus comprises
   a housing, wherein said external connector is located in said housing.

13. The apparatus according to claim 12, device further comprising:
   a display located in said housing; and
   a user interface located in said housing.

14. The apparatus according to claim 12, wherein said apparatus is a mobile terminal.

15. The apparatus according to claim 1, further comprising a maintenance toolkit, connected to said external connector.

16. The apparatus according to claim 15, wherein said maintenance toolkit provides at least one out of a debugging function and a trace function.

17. The apparatus according to claim 15, wherein said maintenance toolkit is connected to said external connector via a maintenance adaptor.

18. A method comprising:
    selecting at least one component out of at least one maintenance component and at least one non-maintenance component, wherein said at least one maintenance component and said at least one non-maintenance component represent electronic components arranged in an apparatus; and
    switching an external connector of said apparatus to said at least one selected component.

19. The method according to claim 18, wherein said switching is performed by at least one switching component arranged in said apparatus, wherein said switching component is configured to switch said external connector to at least one out of said at least one maintenance component and said at least one non-maintenance component.

20. The method according to claim 19, wherein said apparatus comprises at least one processing component, wherein each of said at least one processing component comprises at least one maintenance component of said at least one maintenance component, and wherein a first processing component of said at least one processing component further comprises at least one of said at least one non-maintenance component.

21. The method according to claim 20, wherein a first switching component of said at least one switching component is arranged in said first processing component, and wherein said at least one of said at least one maintenance component and said at least one of said at least one non-maintenance component of said first processing component are connected to an input of said first switching component.

22. The method according to claim 21, wherein at least one maintenance component of at least one further processing component of said at least one processing component is connected to said input of said first switching component.

23. The method according to claim 22, wherein at least one of said at least one further processing component comprises at least two maintenance components, and wherein at least one of said at least one of said at least one further processing component comprises a switching component configured to switch at least one out of said at least two maintenance components to the input of said first switching component.

24. The method according to claim 20, wherein at least one of said at least one maintenance component of said at least one maintenance component is at least one out of a debug component, a test component, a tune component and a trace component, and wherein said debug component is configured to debug software of the corresponding processing component, and wherein said trace component is configured to trace software of the corresponding processing component or hardware of any hardware component.

25. The method according to claim 24, wherein at least one of said at least one maintenance component is at least one out of a JTAG, IEEE P1149.7, STP/PTI and STI/XTI and SWD/SWI/ETM component.

26. The method according to claim 18, wherein said method further comprises providing said external connector with a security function in case that at least one of said at least one selected component is out of said at least one maintenance component.

27. A computer program product in which a program code is stored in a computer readable medium, said program code realizing the following when executed by a processor:
    selecting at least one component out of at least one maintenance component and at least one non-maintenance component, wherein said at least one maintenance component and said at least one non-maintenance component represent electronic components arranged in an apparatus; and
    switching an external connector of said apparatus to said at least one selected component.

28. The computer program product according to claim 27, wherein said switching is performed by at least one switching component arranged in said apparatus, wherein said switching component is configured to switch said external connector to at least one out of said at least one maintenance component and said at least one non-maintenance component.

29. The computer program product according to claim 28, said program code further causes providing said external connector with a security function in case that said selected component is out of said at least one maintenance component.

30. An apparatus, apparatus comprising:
    at least one means for maintenance; and
    at least one means for non-maintenance; wherein said at least one means for maintenance and said at least one means for non-maintenance represent electronic means; and
    a external connecting means, wherein said external connecting means is configured to be switched from a normal mode of operation with said at least one means for non-maintenance to operation with at least one means for maintenance and configured to be switched from said operation with at least one out of said at least one means for maintenance to said normal mode of operation with said at least one means for non-maintenance.

31. The apparatus according to claim 30, wherein said apparatus further comprises at least one switching means for switching said external connecting means to at least one means for maintenance and said at least one means for non-maintenance.

32. The apparatus according to claim 31, wherein said apparatus comprises at least one processing means, wherein each of said at least one processing means comprises at least one means for maintenance of said at least one means for maintenance, and wherein a first processing means of said at least one processing means further comprises at least one of said at least one means for non-maintenance.

* * * * *